(No Model.)

G. W. BAILEY.
COOKING ATTACHMENT.

No. 600,398.        Patented Mar. 8, 1898.

Witnesses
F. B. Berry,
Victor J. Evans

Inventor
George W. Bailey,
by John Wedderburn
Attorney

UNITED STATES PATENT OFFICE.

GEORGE W. BAILEY, OF ST. MARY'S, GEORGIA.

COOKING ATTACHMENT.

SPECIFICATION forming part of Letters Patent No. 600,398, dated March 8, 1898.

Application filed September 8, 1897. Serial No. 650,933. (No model.)

*To all whom it may concern:*

Be it known that I, GEORGE W. BAILEY, a citizen of the United States, residing at St. Mary's, in the county of Camden and State of Georgia, have invented certain new and useful Improvements in Cooking Attachments; and I do hereby declare the following to be a full, clear, and exact description of the invention, such as will enable others skilled in the art to which it appertains to make and use the same.

This invention relates to a cooking attachment; and it consists, essentially, of a support for pots, kettles, saucepans, and the like having regulating attachments to temper the degree of heat and prevent food which is being cooked from burning.

The invention further consists in the details of construction and arrangement of the several parts, which will be more fully hereinafter described and claimed.

The object of the invention is to provide a support of the character set forth adapted to receive and hold with stability various cooking utensils to prevent scorching or burning of the articles being cooked, the device being portable, strong, and durable, simple and effective in its construction and operation, easily manipulated, and comparatively inexpensive in the cost of manufacture.

Figure 1:
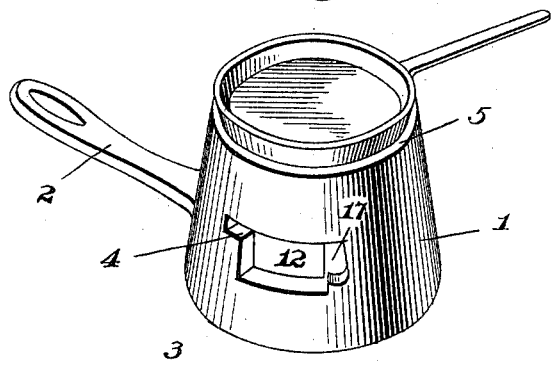
Figure 2:
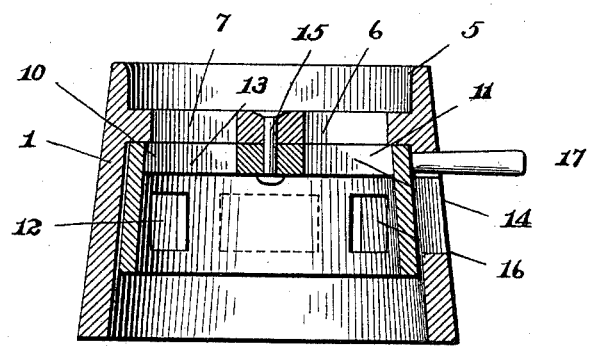
Figure 3:
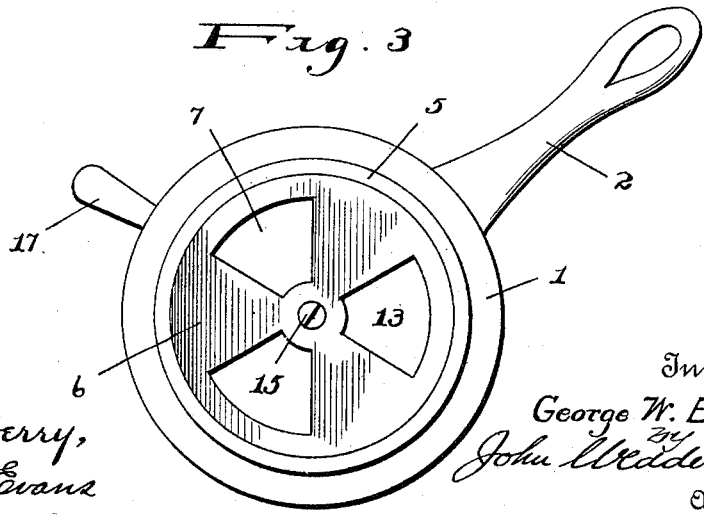

In the accompanying drawings, Figure 1 is a perspective view of a support embodying the invention and shown as holding a cooking utensil thereon. Fig. 2 is a transverse vertical section of the improved holder. Fig. 3 is a top plan view thereof.

Referring to the drawings, wherein similar numerals of reference are employed to indicate corresponding parts in the several views, 1 designates an outer flaring body which is larger at the bottom than at the top and has a handle 2 projecting over one side thereof. At regular intervals around the body of the support openings 3 are formed, one of which communicates at its lower portion with a slot 4 of greater length than said opening. The top of the body 1 has a resting-flange 5, and at a suitable distance above the lower termination thereof is a partition 6, formed with a series of openings 7, extending therethrough, and between the said openings are segmental divisions 8, extending into and forming a part of a central web 9. The openings 7 do not extend completely to the outer edge of the partition and are of substantially segmental shape. In the body 1 a rotatably-mounted damper member 10, comprising a top 11 and a surrounding body 12, which extends downwardly through the interior of the body 1 and the lower edge thereof, is sufficiently above the lower edge of the said body 1 as not to interfere with the operation of the said member. The top 11 is formed with openings 13, extending therethrough, of a size and shape corresponding to the openings 7, and between the said openings 13 are segmental wings 14, running to a central web 15, which is pivotally attached and bears on the web 9, a countersunk pivotal pin 15 or analogous device being inserted through and carried by the said web 9 and engaging the web 15. The surrounding body 12 rests directly beneath the partition 6, and therein at regular intervals openings 16 are formed, similar to the openings 3 and adapted to coincide with the latter. Secured to the said body 12 and projecting outwardly therefrom through the slot 4 is an operating-handle 17. By forming the opening 7 in the partition 6 in the manner stated—*i. e.*, so as to leave an outer slotted rim surrounding the said partition—a firm bearing-surface is provided for the lower edge of the body 12 of the damper member, and the parts are so constructed that they may be made separately and easily assembled or, if desired, disconnected and nested for transportation or other purposes.

In operation the cooking utensil is placed on the upper edge of the body 1, sufficient space being left between the upper edge of the surrounding body 12 of the damper member and said upper edge of the body 1 to allow the depending or depressed portion of a pot or utensil to fit thereinto and be thereby prevented from sliding off of the support. To regulate the amount of heat passing up from the support to the stove or range upon which it may rest, the handle 17 is turned in such direction as to cause the openings 13 and 7 to coincide, and by this adjustment the openings 3, as well as the slot 4, are closed, in view of the fact that the openings 16 in the body 12 of the damper member will be turned away from said openings 3 and slot 4 and the full heat from the stove or range will be permitted to pass upwardly against the bottom or base of the cooking utensil. When it is desired to temper the heat, the handle 17 is moved in the opposite direction a suitable distance and either to cause a partial coincidence of the openings 16 and 3 and also the openings 13 and 7 or to establish a complete coincidence of the openings 16 and 3 and an entire closure of the openings 7 in the partition 6. By this adjustment it will be observed that the air surrounding the support, though heated, in view of its transmittal from the top of the stove or range around which the support may be set, will not exert a strong influence against the cooking utensil as when the openings 7 are clear, but will produce a slower cooking operation, thereby avoiding scorching or burning of foods, such as rice, beans, and the like.

The support may be moved from one portion of a stove or range to another part thereof, and to facilitate this movement the handle 2 is provided, and the latter also extends downwardly, so as to permit it to be used for lifting the support and the cooking utensil that may be rested thereon with greater ease and without danger of breaking said handle.

It is obviously apparent that minor changes in the details of construction, proportion, and dimension of the several parts might be made and substituted for those shown and described without in the least departing from the nature or spirit of the invention.

Having thus described the invention, what is claimed as new is—

In a device of the character set forth, the combination of an outer body having an upwardly-projecting handle and a partition having openings therethrough, the said outer body also having openings extending through the same transversely above the lower termination thereof with extensions in the opposite terminations of one of the latter openings, a rotatable damper member mounted in the said outer body, having openings in the sides and bottom thereof adapted to aline respectively with the openings in the partition and sides of the said outer body, and a handle connected to the said rotatable damper member and projecting through one of the openings in the side of the outer body and adapted to engage the extensions at opposite ends of said openings, substantially as described.

In testimony whereof I have signed this specification in the presence of two subscribing witnesses.

GEORGE W. BAILEY.

Witnesses:
JOHN RICHARDSON,
J. R. BACHLOTT.